United States Patent [19]

Cheek

[11] 4,039,003

[45] Aug. 2, 1977

[54] DROP CHECK VALVE

[75] Inventor: Robert L. Cheek, Odessa, Tex.

[73] Assignee: Carl Lane McCartney, Conroe, Tex.

[21] Appl. No.: 674,079

[22] Filed: Apr. 6, 1976

[51] Int. Cl.² .................................... F16K 15/02
[52] U.S. Cl. .................. 137/516.29; 137/454.6; 137/543.19
[58] Field of Search .......... 137/404.6, 516.25, 516.29, 137/543.19

[56] References Cited

U.S. PATENT DOCUMENTS

| | | | |
|---|---|---|---|
| 2,845,085 | 7/1958 | Robbins | 137/454.6 |
| 3,074,382 | 1/1963 | Alfieri | 137/454.6 X |
| 3,330,294 | 7/1967 | Manning | 137/454.6 X |
| 3,580,275 | 5/1971 | Hanson | 137/516.29 |
| 3,913,615 | 10/1975 | Cooper | 137/543.19 |

Primary Examiner—Harold W. Weakley

Attorney, Agent, or Firm—Marcus L. Bates

[57] ABSTRACT

A drop check valve for choke and kill manifolds which has easily replaceable components therein. The valve apparatus includes a bonnet which houses a replaceable seat member within which a dart is reciprocatingly received. The dart has a seat engaging surface formed thereon which is a frustum of a cone and moves lengthwise of its axis when closing against a conical seat of the removable seat assembly, so that the dart engages the seat to prevent bidirectional fluid flow therethrough.

A replaceable seal circumferentially extends about the cone of the dart to improve the sealing action between the dart and its seat. The seat assembly is provided with radially spaced-apart ports connected to an outlet passageway and fluid flow can only occur through an inlet passageway, up through the seat, into the seat assembly, through the radial ports, and out through the outlet passageway.

13 Claims, 5 Drawing Figures

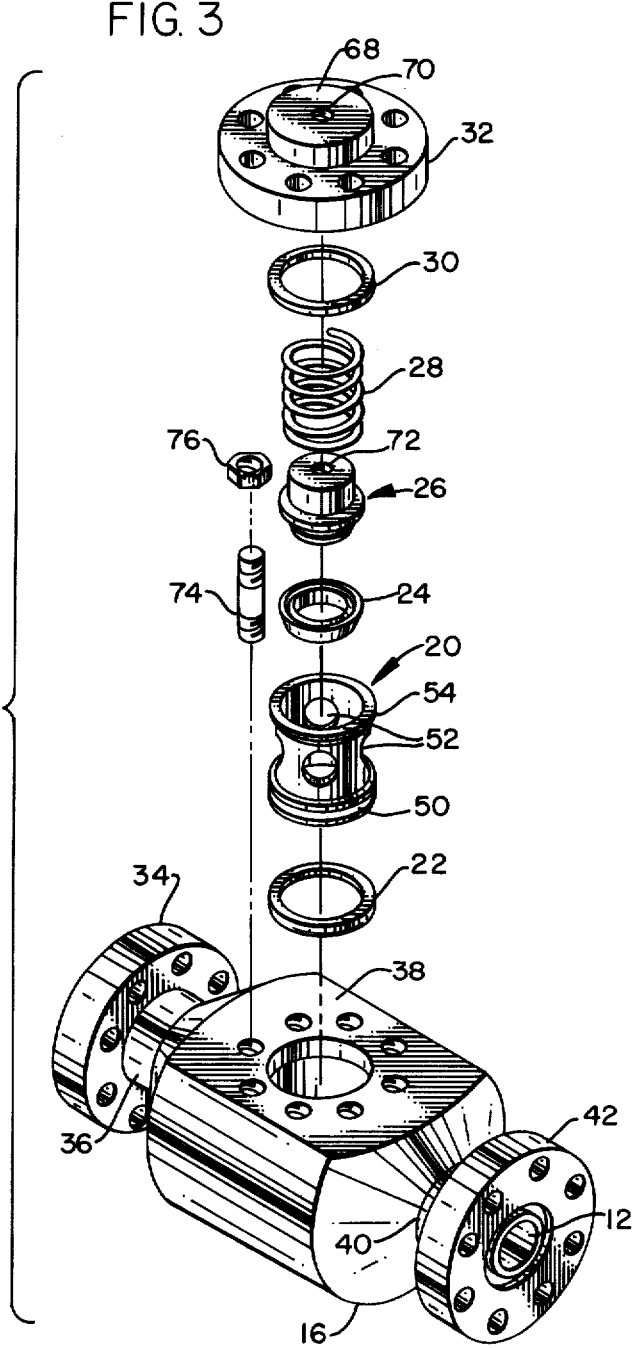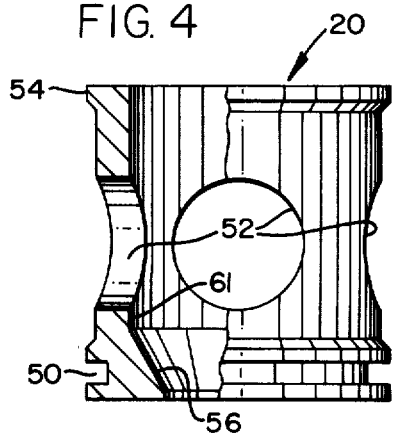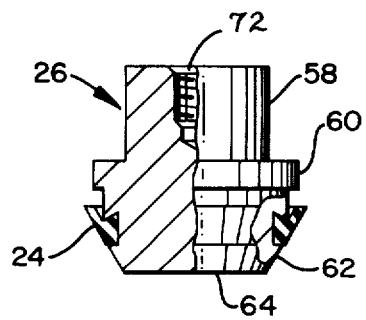

DROP CHECK VALVE

BACKGROUND OF THE INVENTION

There are many occasions when fluid must be forceably pumped through a flow line which leads to a high-pressure point of use. For example, when acidizing boreholes, fluid must be pumped into the borehole against a considerable amount of back pressure, and provision must be made by which no back-flow can occur until the well treatment has been completed. Moreover, in drilling boreholes, it is necessary to pump drilling mud through the drill string and downhole where the lower borehole pressures may occasionally exceed the hydrostatic head of the well; and accordingly, provisions must be made by which no back-flow can occur from the drill string back to the mud pumps.

In carrying out the above-described operation, the component parts of a check valve assembly are subjected to corrosion and abrasion; and therefore, the valve must be built and designed in such a manner that it can be easily overhauled from time to time. Otherwise, the above-mentioned deleterious effects will render the valve inoperative in a very short while, and the expense of operation becomes excessive. Therefore, it is desirable to have a drop check valve made available which is highly efficient in operation, and which can easily be overhauled with a minimum of cost and effort.

SUMMARY OF THE INVENTION

This invention relates to a one-way check valve device comprising a bonnet having an upwardly opening cavity formed therewithin which is closed by a removable flange member. A crossbore extends laterally through the bonnet into communication with the cavity to form an inlet and outlet flow passageway.

A seat assembly is sealingly received in a removable manner within the cavity and forms a cage by which a dart is reciprocatingly captured therewithin.

The seat assembly has a conical aperture at its lower extremity and extends from proximity of an underlying counterbore upwardly in a cylindrical manner. Radial ports formed within a wall of the seat assembly admits flow to occur from the inlet passageway, into the underlying counterbore, up through the conical aperture or seat, into the cage, and then out through a radial port and into the outlet flow passageway, where the flow can then be directed to aa geographical location externally of the valve device.

The dart is cylindrical in form and includes an upper cylindrical, marginal length separated from a lower conical portion by a circumferentially extending flange. The lower concial portion of the dart is a frustum of a cone movable lengthwise of its axis and closing against the conical aperture formed within the seat assembly.

The seat assembly cooperates with a biasing means, the closure member, and the flange of the dart to enable the biasing means to be incorporated in mounted relationship within the apparatus.

Seal means placed on the closure member, seat assembly, and dart can be rapidly renewed by removing the closure member, withdrawing the seat assembly from the main valve body, withdrawing the dart from the seat assembly, thereby readily gaining access to the various component parts of the check valve assembly.

A primary object of the present invention is the provision of improvements in a drop check valve assembly.

Another object of the present invention is to provide an improved drop check valve which can be rapidly disassembled for renewing some of the component parts thereof.

A further object of this invention is to disclose and provide a drop check valve assembly which prevents return flow in a new and unobvious manner.

A still further object of this invention is the provision of a drop check valve assembly which enables unidirectional flow to occur therethrough in an improved manner and which prevents return flow therethrough in still another improved manner.

Another and still further object of this invention is to disclose and provide a drop check valve assembly which includes improvements in the manner in which bidirectional flow is prevented.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

BRIEF DESCRIPTION OF THE DRAWINGS

FIG. 3 is an exploded view of the valve apparatus disclosed in the foregoing figures;

FIG. 4 is an enlarged, part cross-sectional view of part of the apparatus disclosed in FIGS. 2 and 3; and, FIG. 5 is an enlarged, part cross-sectional view of part of the apparatus disclosed in FIGS. 2 and 3.

DETAILED DESCRIPTION OF THE PREFERRED EMBODIMENT

Figure 1:
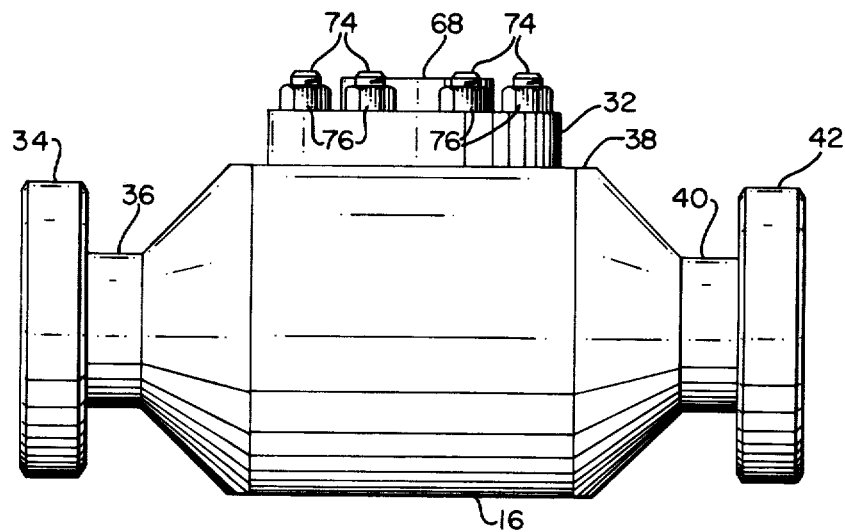
FIG. 1 is an elevational view of a drop check valve assembly made in accordance with the present invention.
Figure 2:
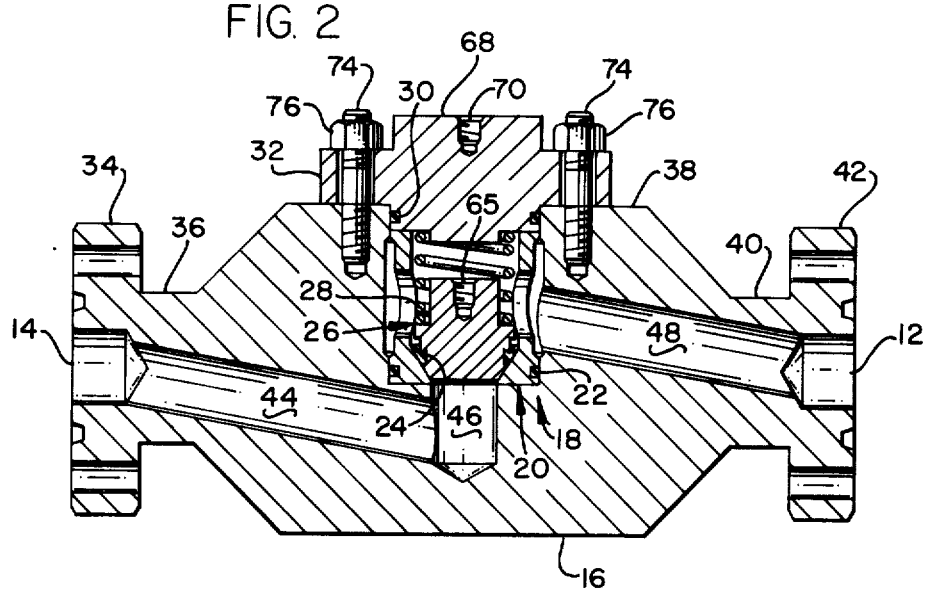
FIG. 2 is a longitudinal, cross-sectional view of the valve assembly disclosed in FIG. 1.

In the figures of the drawings, there is broadly indicated a drop check valve assembly made in accordance with the present invention. The valve assembly has an outlet end 12 and inlet end 14 formed within the main body or bonnet 16. An upwardly opening, cylindrical cavity 18 is formed within a central portion of the bonnet for receiving a seat assembly 20 therewithin. Seal means 22 prevents the occurrence of fluid flow between the interface formed between the seat assembly and the cavity.

Seal assembly 24 circumferentially extends about a lower conical face of a dart 26, while a biasing means in the form of a coil spring 28 biases the dart in a continuous manner towards the lower extremity of the cavity. Seal means 30 circumferentially extends about a lower skirt portion of a closure member 32.

Inlet bolt flange 34 reduces in diameter at the inlet throat portion 36 and then again enlarges to form the main central body portion of the bonnet. Upper horizontal surface 38 forms a support surface for abutingly receiving the before-mentioned bonnet flange 32 in close tolerance relationship therewith. Throat 40 is reduced in diameter respective to an outlet flange 42, with the outlet and inlet flanges providing means by which the valve assembly can be series connected within a flow line.

A crossbore is formed through the bonnet and includes an inlet passageway 44, which interconnects the inlet 14 to a reduced diameter counterbore 46. The counterbore is positioned axially aligned in underlying relationship respective to the before-mentioned upwardly opening cavity. The crossbore includes an outflow passageway 48 which interconnects the outlet 12 to a medial marginal circumferentially extending sidewall portion of the before-mentioned cavity.

As best seen illustrated in FIGS. 3 and 4, the before-mentioned seal 22 is received within a circumferentially extending groove 50 of the seat assembly, while a plurality of radially spaced ports 52 are formed within a sidewall of the seat assembly, with the ports being radially disposed respective to one another and aligned with the central axis thereof being coincidnet with a horizontal plane and placed at an angle respective to the central longitudinal axis of outlet passageway 48. An outwardly directed flange 54 is spaced from the outwardly directed flange at 50 and forms the uppermost marginal end portion of the valve seat assembly, while a valve seat in the form of a conical aperture 56 is formed within the interial lower marginal end portion of the seat assembly. The seat assembly has a constant inside diameter 61 which converges to form the valve seat 56. It will be noted that an annular cutout is therefore formed between the two spaced enlargements 50 and 54, with the radial ports being centrally located within the annular cutout. It will further be noted that the upwardly opening cavity is provided with an annular enlargement about the central marginal wall surface thereof to thereby form a resultant annular flow passageway between the exterior of the seat assembly and the interior of the cavity.

FIGS. 3 and 5 illustrate the details of the before-mentioned dart 26. The dart preferably is fabricated from solid steel alloy and includes an upper constant diameter body portion 58 which enlarges into an annular flange 60 before converging at 62 and terminating in a lowermost end portion 64. Hence the dart includes a seating element which is a frustum of a cone and is movable lengthwise of its axis into closing engagement with a conical aperture formed in the seating assembly. And at the same time, the dart is reciprocatingly captured within the seating assembly, while a biasing means 28 cooperates with the dart at 60 and with the bonnet flange so as to constantly urge the dart towards the lowermost portion of the upwardly opening cavity. Opposed marginal interior lengths of the spring biasing means is captured about the upper marginal portion of the dart and the lower marginal portion of the closure means, while the interior of the seat assembly captures both the dart and the spring therewithin.

The bonnet flange has an upwardly directed cap 68 within which aperture 70 has been drilled so that a bolt can be placed within the threaded aperture 70 to thereby facilitate removal of the bonnet flange from the surface 38 of the bonnet. The dart is similarly provided with a threaded aperture 72 to facilitate removal thereof from the seat assembly 20. A circle of studs 74 and nuts 76 provide a fastener means by which the bonnet flange can be suitably affixed to the horizontal face 38 of the bonnet.

It will be noted that the seal 24 has an outermost circumferentially extending surface area which extends slightly beyond the metal surface 62 so that as the dart is forced into seated relationship respective to seat 56, the resilient seal can be deformed into perfect seating engagement therewith. This action continues with metal to metal contact being avoided between surfaces 56 and 62 by the resilient seal 24 as the upstream pressure increases. The upstream pressure urges the upper circumferentially extending skirt portion of the seal against seat surface 56 as the pressure increases to thereby provide a very tight seal against fluid flow. At the same time the dart is forced towards the seat with a piston-like action.

In operation, as flow occurs at inlet 14 and continues through passageway 44 into the counterbore 46, the dart will be lifted from seated engagement respective to the seat of the seat assembly, whereupon flow can continue through the conical aperture and into the interior of the seal assembly, where the flow continues through radial ports 52, through the annulus formed between the seal assembly and the cavity, into the outlet passageway 48, where the flow then leaves the valve at outlet 12.

When the pressure drop from 14 towards 12 is reduced so that backflow from 12 towards 14 occurs, the dart will be urged towards the lower extremity of the cavity whereupon resilient seal 24 sealingly engages the conical aperture 56 in the above-described manner, thereby precluding backflow from occurring.

The valve is rapidly and inexpensively reconditioned by merely removing the nuts 76, engaging aperture 70 with a suitable knocker or other pulling means, and removing the bonnet flange from the bonnet. The spring 28 can be removed at this time as the dart 26 is lifted from the seat assembly by screwing a bolt or the like into aperture 72 and lifting the dart from captured relationship respective to the seal assembly.

The seal assembly is next removed from the cavity 18 by engaging the upper extremity or sidewall of the ports 52 with a suitable tool which can exert sufficient upthrust for achieving this purpose. The seals 22, 24, and 30 are replaced and the valve reassembled and returned to service.

The present valve is made of precision machined parts that give long, trouble-free service and is simple and inexpensive to repair. The valve can be used in conjunction with mud pumps and acidizing projects, as well as water flood projects. The present vale is made in such a manner that the flow therethrough erodes the massive main body or bonnet and does not erode the critical components of the valve. For example, flow entering the downwardly sloped inlet passageway 44 first contacts the inner peripheral wall surface forming the counterbore 46 before proceeding up into the valve assembly, where the flow suffers very little pressure drop in assuming a change in direction as it continues into passageway 48 and out of the valve assembly. The configuration of the valve and the cooperative relationship of the various component parts thereof avoid chattering and other audible evidences of undesirable wear associated with some prior art valve structures.

Another major feature of importance of the drop check valve of the present invention lies in the absence of any internal threaded areas. This absence of internal threads is desirable because the abrasive flow of fluids would otherwise rapidly wash-out or cut the threads. This undesirable result would present costly overhaul problems in the valve. Therefore, the present invention provides a valve structure devoid of internal threads and further employs unique flow paths which further avoid wear at the most critical areas of the valve structure.

The angle of the inlet passageway induces a swirling motion into the flowing fluids so that abrasive wear is reduced to a minimum respective to the working parts of the valve structure.

I claim:

1. A one-way check valve device for series connection in a flow line to a borehole comprising:

a main body in the form of a valve bonnet, an upwardly opening vertical bore formed in said main body, a crossbore connected to said vertical bore to form an inlet passageway and an outlet passageway in said main body; said inlet passageway having an inlet formed at one extremity of said crossbore, said outlet passageway having an outlet formed at one extremity of said crossbore; said outlet passageway commences at a midportion of said vertical bore;

a removable seat member, said seat member being cylindrical in form, an axial bore through said seat member, a circumferentially extending, conical seating surface formed on the interior of said seat member, a plurality of radially disposed ports formed about a midbody portion of said seat member, a bonnet seal between said seat member and said vertical bore;

a dart slidably received within said seat member, said dart having a seat engaging face formed thereon which is a frustum of a cone and moves lengthwise of its axis when sealingly seated against said seating surface to prevent flow through said seam member, means biasing said dart towards said seating surface;

a counterbore underlying said vertical bore, said counterbore upwardly enlarges into said vertical bore, said inlet passageway terminates within said counterbore; said radial ports being axially aligned along a common horizontal plane and placed in fluid communication with said outlet passageway; and a closure member removably received by said main body for closing the upper extremity of said vertical bore.

2. The check valve of claim 1 wherein said vertical bore has opposed reduced diameter marginal wall portions and a medial enlarged diameter wall portion;

said removable seat member having opposed enlargements which are of a diameter to be slidably received in close tolerance relationship within said opposed reduced diameter marginal wall portions;

so that said removable seat cooperates with said vertical bore to form an annular area therebetween through which fluid can flow.

3. The check valve of claim 2 and further including an annular seal means about the lower enlargement formed on said removable seat assembly.

4. The check valve of claim 1 wherein said dart is provided with an annular resilient seal which is removably received about said face, said seal having a thick lower body portion which reduces into an upwardly and outwardly directed skirt, an outwardly directed groove formed in said seat engaging face for receiving said thick lower body portion therein such that an outer marginal portion of said lower body portion and all of said skirt are interposed between said seat engaging face and said conical seating surface.

5. The check valve of claim 1 wherein said closure member has a reduced diameter lowermost end which forms a spring receiving annular area, said dart has an annular shoulder, said biasing means is a spring which is received against the shoulder and within the spring receiving annular area.

6. The check valve of claim 1 wherein said vertical bore includes opposed reduced diameter marginal wall portions and a medial enlarged diameter wall portion;

said removable seat member having opposed enlargements which are of a diameter to be slidably received in close tolerance relationship within said opposed reduced diameter marginal wall portions whereby said removable seat cooperates with said vertical bore to form an annular area therebetween through which fluid can flow;

an annular seal means positioned about the lower enlargement formed on said removable seat assembly.

7. The check valve of claim 1 wherein said dart is provided with an annular resilient seal which is removably received by said face;

said seal having a reduced inside diameter lower body portion which enlarges into an upwardly directed skirt; an outwardly directed groove formed in said seat engaging face for receiving an inner marginal portion of said lower body therein such that an outer marginal portion of said lower body and all of said skirt are interposed between said seat engaging face and said conical seating surface;

said closure member includes a reduced diameter lowermost end which forms a spring receiving annular area, means forming an annular shoulder on said dart; and said biasing means is a spring received against the shoulder and about the annular area.

8. A one-way check valve device comprising:

a main housing forming a bonnet, means forming an upwardly opening cavity within said bonnet;

a removable seat assembly, a dart, a bonnet flange;

means forming a crossbore through said bonnet, which includes a fluid inlet passageway and a fluid outlet passageway;

said seat assembly being cylindrical in form, means forming a conical aperture within the lower extremity of said seat assembly, and a radial port within a wall thereof; said seat assembly being sealingly received in a removable manner within said upwardly opening cavity;

said dart having a cylindrical upper body portion separated from a conical lower body portion by an annular flange, said conical lower body portion including a frustum of a cone which disposes a conical face made complementary respective to the conical aperture formed within said seat assembly;

said dart being movable lengthwise of the longitudinal central axis of said frustum of a cone and closing said conical aperture in said seat assembly;

said bonnet flange forming a closure member for said upwardly opening cavity, means biasing said dart towards said seat;

said inlet passageway of said crossbore terminating in fluid communication with said conical seat, said outlet passageway commencing in fluid communication with said radial port.

9. The check valve of claim 8 wherein said cavity has opposed, reduced diameter, vertical marginal wall portions and a medial, enlarged diameter wall portion;

said seat member having opposed, spaced enlargements which are of a diameter to be slidably received in close tolerance relationship within said opposed reduced diameter marginal wall portions;

so that said seat member cooperates with said cavity to form an annular area therebetween through which fluid can flow.

10. The check valve of claim 9, and further including an annular seal means about the lower enlargement formed on said seat assembly.

11. The check valve of claim 8 wherein said dart is provided with an annular resilient seal which is removably received about said face, said seal having a thick lower body portion which reduces into an upwardly and outwardly directed skirt, an outwardly directed groove formed in said conical face for receiving said thick lower body portion therein such than an outer marginal portion of said lower body portion and all of said skirt are interposed between said conical face and said conical aperture.

12. The check valve of claim 8 wherein said bonnet flange has a reduced diameter lowermost end which forms a spring receiving annular area, said dart has an annular shoulder, said biasing means is a spring which is received against the shoulder and within the spring receiving annular area.

13. The check valve of claim 8 wherein said cavity includes opposed reduced diameter marginal wall portions and a medial enlarged diameter wall portion;

said removable seat member includes means forming opposed enlargements thereon which are of a diameter to be slidably received in close tolerance relationship within said opposed reduced diameter marginal wall portions whereby said removable seat cooperates with said cavity to form an annular area therebetween through which fluid can flow; and, an annular seal means positioned about the lower enlargement formed on said removable seat assembly.

* * * * *